United States Patent

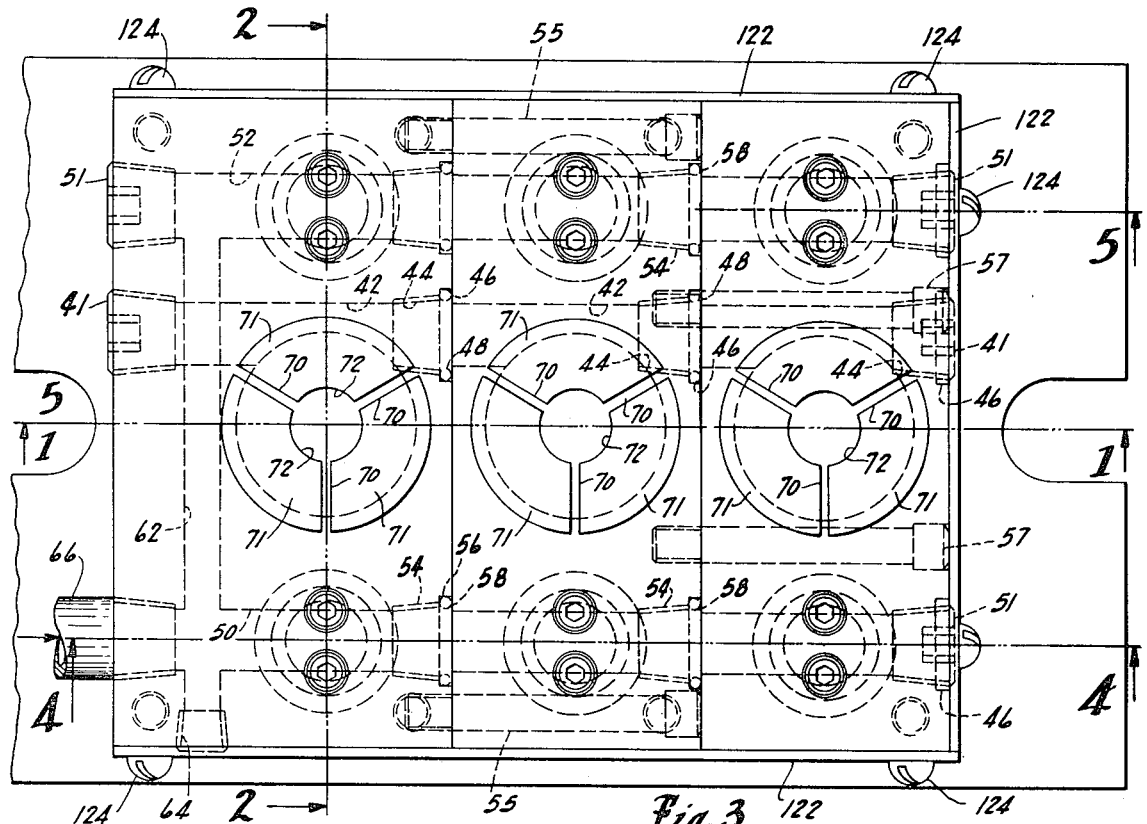
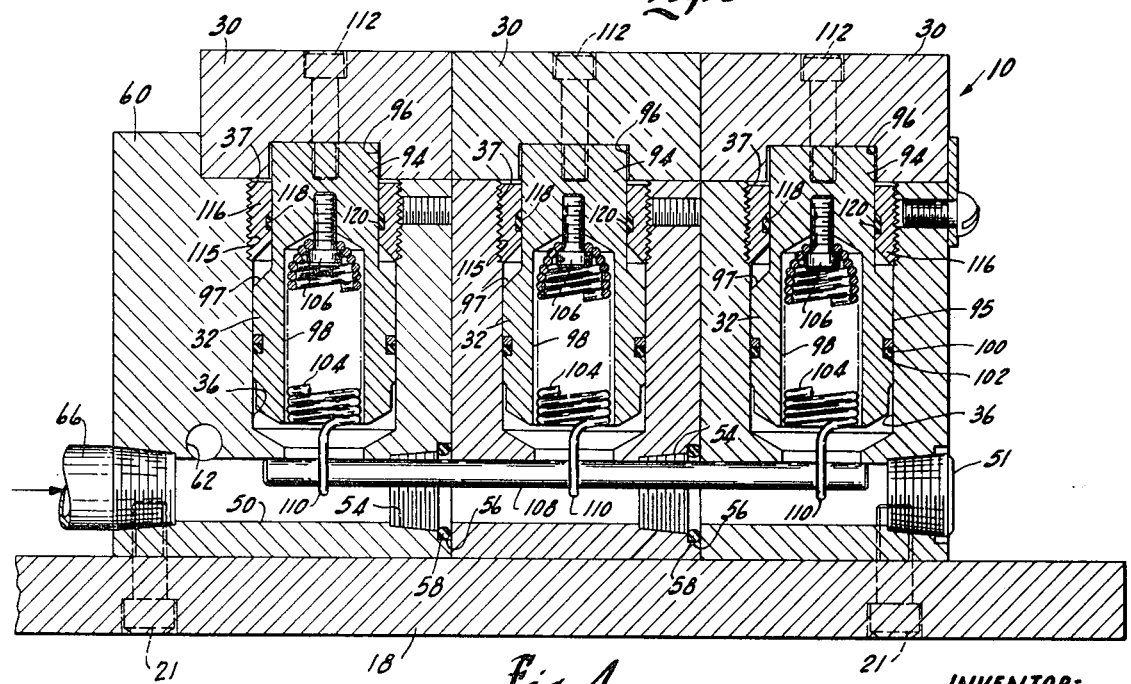

[11] 3,632,122

| [72] | Inventor | Donald W. Sessody<br>Milwaukee, Wis. |
|---|---|---|
| [21] | Appl. No. | 16,275 |
| [22] | Filed | Mar. 4, 1970 |
| [45] | Patented | Jan. 4, 1972 |
| [73] | Assignee | Applied Power Industries, Inc.<br>Milwaukee, Wis. |

[54] MULTIPLE COLLET CHUCK
12 Claims, 5 Drawing Figs.

[52] U.S. Cl....................................................... 279/4,
269/20, 279/50
[51] Int. Cl...................................................... B23b 31/30
[50] Field of Search........................................... 279/1 DC,
4, 20, 43, 46, 50, 74; 269/20, 25, 26

[56] References Cited
UNITED STATES PATENTS

| 2,889,150 | 6/1959 | Goldring et al. | 279/4 |
| 3,087,736 | 4/1963 | Lukas | 279/4 |
| 2,366,979 | 1/1945 | Obecny | 279/4 X |

FOREIGN PATENTS

| 1,283,731 | 3/1961 | France | 269/20 |

Primary Examiner—Andrew R. Juhasz
Assistant Examiner—James F. Coan
Attorney—James E. Nilles ABSTRACT: A multiple collet chuck including a main collet chuck and a number of secondary collet chucks. Each main and secondary collet chuck including a split ring collet rigidly mounted in collet receiving openings provided in each of the base members for the chucks and an actuator bar having a bearing guide positioned in each of the collet receiving openings. The actuator bar being movable into engagement with each of the collets to produce a gripping action on a workpiece supported within the collets. A pair of pistons are mounted in each of the base members for moving the actuator bar into engagement with the collets. Chip flushing and cooling fluid passages are provided in each of the base members for each of the collets.

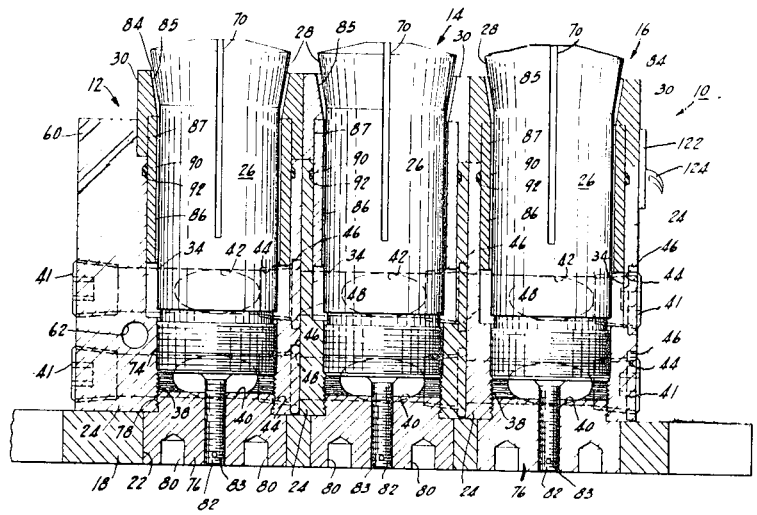

INVENTOR:
DONALD W. SESSODY
BY James E. Niller
ATTORNEY 3,632,122

MULTIPLE COLLET CHUCK

BACKGROUND OF THE INVENTION

Collet chucks of the type shown in U.S. Pat. No. 3,087,736, issued Apr. 30, 1963 and entitled "Collet Operator" generally include a collet mounted for reciprocal motion in a base. The collets are reciprocated by an actuator bar rigidly secured to the collet and positioned within a recess in the base to simultaneously move all of the collets in the base into engagement with a collet seat to produce a gripping action. Positioning of workpieces in a movable collet is difficult due to the variation in the height of the collets. This type of collet chuck is also inflexible in use being limited to some extent to the number of collets provided in each collet chuck.

SUMMARY OF THE PRESENT INVENTION

The multiple collet chuck of the present invention is readily adaptable to supporting any number of workpieces and provides increased accuracy in locating the workpieces in the collets. This is accomplished by using a main or principal collet chuck and secondary collet chucks as needed. Each main or secondary collet chuck is an independent unit and includes a base member and a split ring collet which is rigidly mounted in a collet receiving opening provided in the base member. The collets are closed to produce a gripping action on a workpiece by the movement of an actuator bar into engagement with the collet without changing the position of the collet. A highly accurate alignment of the workpieces results due to this rigid collet mounting.

Stability in the movement of the actuator bars is achieved by securing a bearing guide to the actuator and positioning the guide in the collet receiving openings. A novel cooling and chip flushing arrangement is provided for each of the collets to minimize chip damage and overheating of the workpiece. Due to the stationary connection of the split ring collets in the base, the collet seat can be machined directly into the collet actuator and automatically adjusts to wear to produce a positive gripping action at all times.

Other objects and advantages will become apparent from the following detailed description when read in connection with the accompanying drawings.

BRIEF DESCRIPTION OF THE DRAWINGS

FIG. 3 is a top view of the collet showing the fluid flow passages through the base members;

FIG. 4 is a view in section taken on line 4—4 of FIG. 3 showing the actuator bars connected to the pistons;

DESCRIPTION OF THE PREFERRED EMBODIMENT

Figure 5:
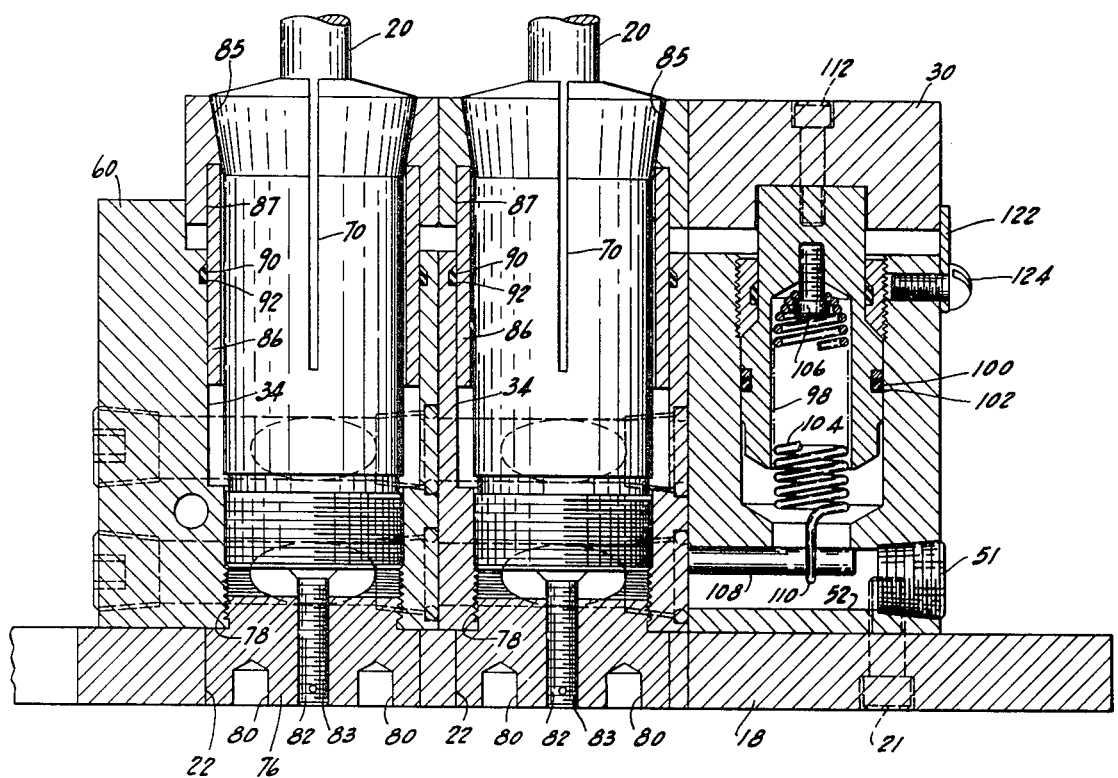
FIG. 5 is a view taken on line 5—5 of FIG. 3 showing the position of the actuator bar when moved into engagement with a collet.

The multiple collet chuck 10 of this invention can be readily adapted to accurately support one or more workpieces 20. In this regard, the multiple chuck 10 includes a main or primary collet chuck 12 and a number of secondary collet chucks 14 and 16 mounted on a support plate 18. The number of workpieces 20 supported by the multiple collet chuck 10 being limited only by the number of primary and secondary collet chucks that can be mounted on the base or support plate 18.

Each primary and secondary collet chuck generally includes a base member 24, a split ring collet 26 having a tapered head 28, and an actuator bar 30. The actuator bars 30 are moved into engagement with the tapered head 28 of the collets 26 to produce a gripping action on the workpiece 20 by means of hydraulic pistons 32 provided within the base member 24.

Figure 1:
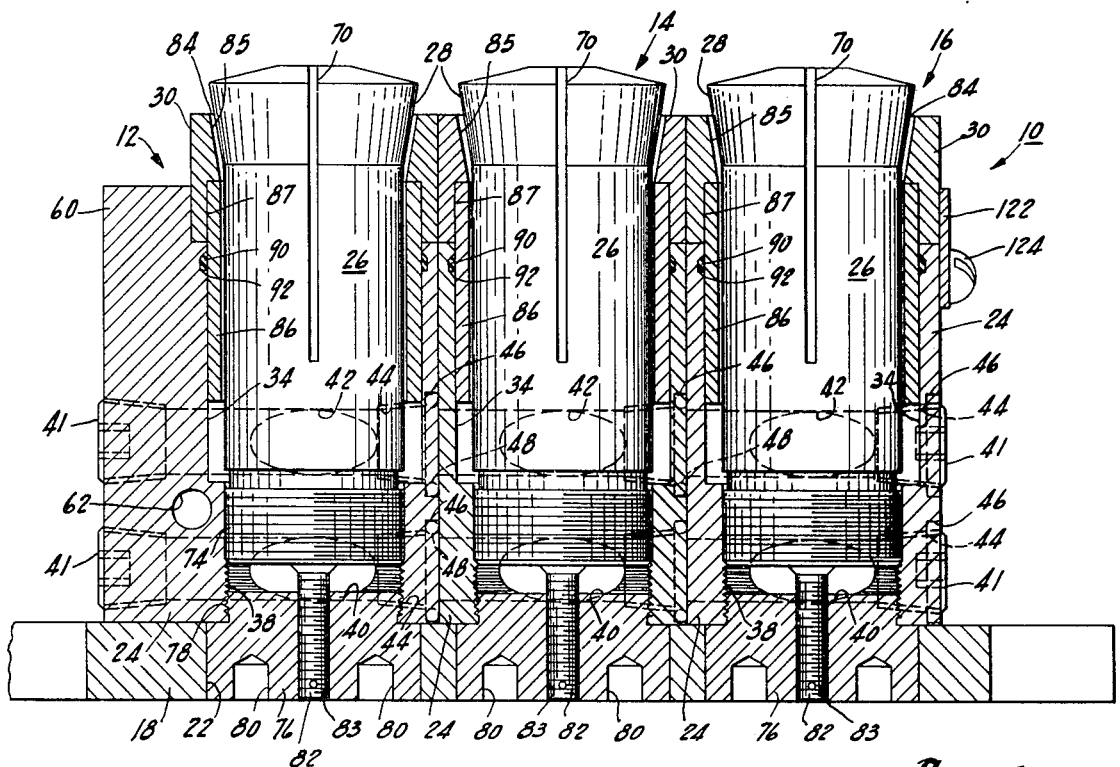
FIG. 1 is a side view in section of the collet chuck of this invention with two secondary collet chucks secured to the master collet chuck.
Figure 2:
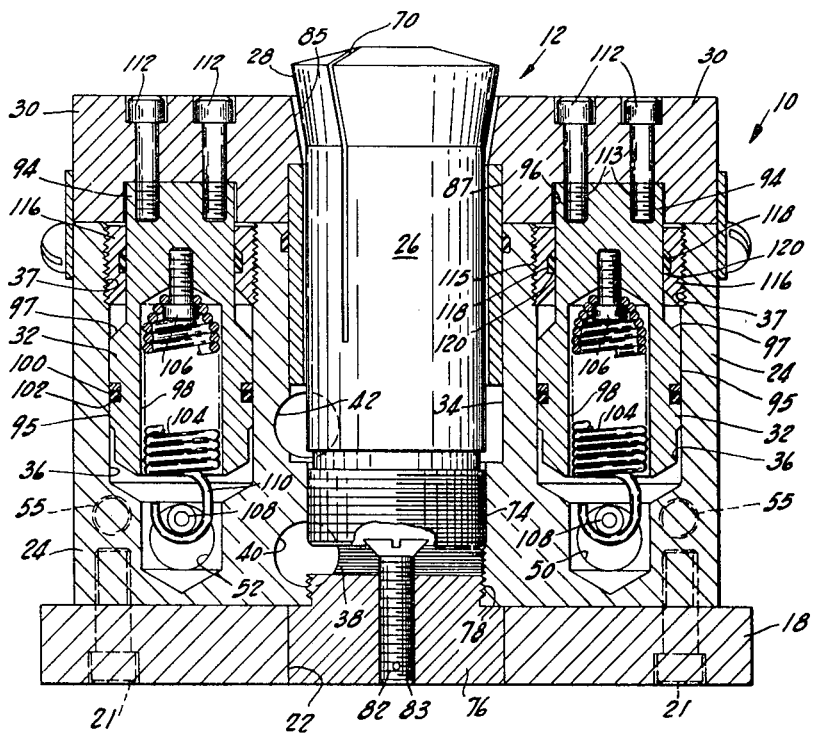
FIG. 2 is a sectional view taken on line 2—2 in FIG. 3 showing the location of the actuator pistons relative to the collet.

More particularly and referring to FIGS. 1, 2 and 3 of the drawings, each of the base members 24 is provided with a collet receiving opening 34 and a pair of piston cylinders 36. Each collet receiving opening 34 includes a reduced diameter threaded section 38 at the bottom of the opening 34. Each cylinder 36 includes a threaded section 37 at the upper open end of the cylinder.

Means are provided for admitting cooling and chip flushing fluid into the collet openings 34 in the form of a lower cooling fluid passage 40 and an upper cooling fluid passage 42. The lower passage 40 passes through the threaded section 38 of the opening 34 at a tangent to the radius of the threaded section 38. The upper cooling fluid passage 42 passes through the collet receiving openings 34 above the threaded section 38 and at a tangent to the opening 34. Each of the passages 40 and 42 is provided with a tapered threaded section 44 at one end and a recess 46 around the open end of the threaded section 44 for an O-ring seal 48.

Means are provided, as shown in FIGS. 3 and 4, for admitting high-pressure fluid into the piston cylinders 36 in the form of a pair of passages 50 and 52 provided in a parallel relation on each side of the base members 24. Each of the passages 50 and 52 passes through the bottom of the cylinders 36 and terminates at one end in a tapered threaded section 54 having a recess 56 for an O-ring seal 58.

The base member 24 for the collet chuck 12 is used as the main or primary chuck and includes an enlarged end wall 60 on one side having means for interconnecting the passages 50 and 52. Such means is in the form of a transverse passage 62 which passes through the passage 50 into the passage 52. The open end of the passage 62 is closed by means of a plug 64. All high-pressure fluid is admitted to the passage 50 through an inlet pipe 66 and passes through the transverse passage 62 into the passage 52 to provide equal pressure in each of the cylinders 36.

The multiple collet chuck 10 is formed by securing the base members 24 to the support plate 18 by means of screws 21. The support plate 18 includes an opening 22 for each of the collet chucks mounted thereon. The passages 40, 42, and 50, 52 in each of the base members 24 mounted on the support plate 18 are sealed to the adjacent base members 24 by means of the O-ring seals 48 and 58, respectively. In this regard, screws 55 are used to draw base member 24 for secondary collet chuck 14 tightly against base member 24 for the main collet chuck 12. Screws 57 are used to draw the base member 24 for collet chuck 16 tightly against the base member 24 for the collet chuck 14. The open end of the passages 40, 42 and 50, 52 in collet chuck 16 are closed by means of threaded plugs 41 and 51, respectively.

Each of the collets 26 includes a tapered head 28, three equally angularly spaced slots 70 to split the head into sections 71, a central workpiece receiving aperture 72, and a threaded section 74 around the base. The collets 26 are secured in the collet receiving openings 34 provided in each of the base members 24 by means of the threaded section 74 which is adapted to be threadedly received in the threaded section 38 at the bottom of the opening 34.

Means are provided for closing the collet receiving openings 34 in each of the base members in the form of a number of stop adjustment plugs 76. In this regard, each plug 76 includes a reduced diameter threaded section 78 which is adapted to be threadedly received in the lower end of the threaded sections 38 of the collet receiving openings 34. Openings 80 are provided in each of the plugs 76 to aid in tightening the plugs against the bottom of the base members 24.

Each plug 76 is provided with means for adjusting the depth of the workpiece opening 72 in the collets 26. Such means is in the form of a screw 82 which is threadedly received in a threaded aperture 83 provided in the plugs 76. The screw 82 can be easily adjusted to any height through the opening 72 in the collet 26.

Means are provided for compressing the tapered head 28 of the collets 26 to produce a gripping action on the workpiece 20 which has been previously positioned within the apertures 72 of the collet and seated on the adjustment screws 82 at the end of the collet receiving opening 34. Such means is in the form of the actuator bars 30 which are positioned on the top of the base members 24. Each of the actuator bars 30 includes an opening 84 which has a tapered section 85 corresponding to the taper of the heads 28 of the collets 26, and an enlarged diameter section 87. The tapered section 85 forms a collet seat which is moved upwardly, as seen in FIG. 5, into engagement with the tapered head 28 of the collet with sufficient force to squeeze the split sections 71 of the head 28 against the workpiece 20.

The actuator bars 30 are guided or stabilized to maintain an equal distribution of force on the collets 26 by means of cylindrical bearing guides 86 which are press-fitted into the openings 87 provided in the actuator bars 30. Each guide 86 is inserted into the collet receiving openings 34 and is wiped clean by means of wiper rings 90 provided in grooves 92 at the upper end of the openings 34. The guides 86 have an outer diameter substantially equal to the inner diameter of the openings 34 and an inner diameter slightly larger than the outer diameter of the collets 26.

The actuator bars 30 are moved relative to the collets 26 to produce the gripping action on the workpiece 20 by means of the pair of pistons 32 provided in each of the base members 24. Each of the pistons 32 (FIGS. 2 and 4) includes a piston head 95 having an axially extending opening 98 and a reduced diameter rod or portion 94 connected to the piston head 95 by a shoulder 97. The rod 94 is positioned within recesses 96 provided in the actuator bars 30. The pistons 32 are inserted into the cylinders 36 provided in the base members and are sealed therein by means of an O-ring 100 provided in a groove 102 on the outer periphery of the piston head 95.

The pistons 32 are biased inwardly into the cylinders 36 by means of springs 104. In this regard, the springs 104 are retained in the central opening 98 by means of screws 106 and are connected to retainer rods 108 located in the fluid passages 50 or 52 by hooks 110. The springs 104 are connected to the retainer rods 108 by seating the pistons 32 in the bottom of the openings 36 and inserting the retainer rods 108 into the passages 50 or 52 through the hook 110 provided at the end of the spring. The pistons 32 are then connected to the actuator bars 30 by means of screws 112 which are threadedly received in threaded openings 113 provided in the end of the portion 94. The screws 112 are used to draw the reduced diameter portion 94 into the recesses 96 in the actuator bars 30.

Means are provided to limit the movement of the pistons 32 in the cylinders 36 in the form a retainer ring 116 which has an inner diameter substantially equal to the diameter of the reduced diameter portion 94 of the piston and a threaded section 115 on the outer surface for threaded engagement with the upper threaded portion 37 of the opening 36. The retainer ring 116 is used to wipe dirt from the portion 94 of the piston 32 by means of a wiper ring 118 provided in a groove 120 in the inner surface of the retainer ring 116. The retainer ring 116 limits the upward movement of the pistons 32 by engaging the shoulder 97 on the piston head 95.

The collets 26 are closed by admitting fluid under pressure from a conventional fluid pressure source such as a pump, through the inlet opening or pipe 66 into the passages 50, 62, and 52 in the base members 24. The hydraulic fluid will act on the pistons 32 moving the pistons upward against the bias of the springs 104 pushing the collet seat 85 in the actuator bars 30 into engagement with the tapered head 28 of the collet 26. The tapered collet seat 85 forces the split head sections 71 of the collet to grip the workpiece. On release of the pressure of the hydraulic fluid in the passages 50 and 52, the springs 104 will retract the pistons in the base member 24 pulling the actuator bars 30 away from the tapered head 28 of the collet releasing the workpiece.

Cooling fluid is admitted into the central aperture 72 of the collets 26 by means of the passages 40 which are connected to the collet receiving openings 34 in the threaded sections 38. The cooling fluid enters the opening 34 tangentially and flows spirally upward through the openings 72 and out through the slots 70 in the upper end of the collet 26. The tangential flow of fluid through the central opening 72 assures good circulation of the cooling fluid around the workpiece as the fluid passes upward through the collet 26.

Chips are prevented from accumulating around the head 28 of the collet 26 and in the spaces between the collet and the guides by means of the admission of a flushing fluid through the passages 42. The flushing fluid flows into the collet receiving openings 34 and flows upwardly in the space between the guides 86 and the collet 26.

The gap between the actuator bars 30 and the base members 24 is protected from the accumulation of foreign matter by means of a plate 122 which is secured to the base members 24 by means of screws 124. The plate extends upwardly far enough to close the gap between the actuator bars 30 and the base members 24 when the collets 26 are closed on the workpiece 20 as seen in FIG. 5.

ASSEMBLY OF THE MULTIPLE COLLET CHUCK

In assembly, and depending on the number of workpieces 20 to be machined, the base member 24 of the main collet chuck 12 is secured to the support plate 18 by means of screws 21 with the collet receiving opening 34 aligned with opening 22. The base members 24 for the secondary collet chucks 14 and 16 are also secured to the support plate 20 by screws 21 with each of the collet receiving openings 34 aligned with openings 22. The passages 40, 42, 50 and 52 in the main and secondary base members will be in alignment and will be sealed by the seals 48 and 58 when the screws 55 and 57 are tightened. The passages 40, 42, 50 and 52 in the last base member 24 are closed by screwing plugs 41 and 51 into the threaded tapered sections 44 and 54 at the end of the passages. The pistons 32 with the springs 104 secured in the openings 98 are inserted into the cylinders 36 and the retainer rods 108 inserted into the passages 50 and 52 through the hooks 110 of the springs 104. Retainer rings 116 are screwed into the threaded sections 37 of the cylinders 36 to limit the motion of the pistons and to seal the cylinders 36.

The actuator bars 30 are positioned on the base members 24 by inserting the guides 86 into the collet receiving openings 34 with the recesses 96 aligned with the upper portion 94 of the pistons 32. Screws 112 are screwed into the rods 94 to draw the piston 32 upward into engagement with the actuator bar 30 against the bias of the spring 104.

The collets 26 are inserted into the guides 86 and are screwed into the threaded sections 38 of the collet receiving openings 34. The open end of the openings 34 are closed by the plugs 76 which are screwed into the lower portion of the threaded sections 38. The screws 82 are then adjusted to provide the required depth to the openings 72 in the collets 26.

OPERATION

Once the depth of the workpiece opening 72 has been set, support plate 18 for the multiple collet chuck is secured to a work surface and fluid connections made to the passage 40, 42 and 50. The workpieces 20 are inserted into the opening 72 in the collets and fluid pressure applied to the pistons 32. The actuator bars 30 will move upward moving the collet seat 85 into engagement with the tapered head 28 of the collet. The force of the hydraulic fluid acting on the pistons should be high enough to achieve a tight grip on the workpiece. Cooling and flushing fluid is then circulated through passages 40 and 42 during the machining operation.

I claim:

1. A collet chuck for holding a workpiece, said chuck comprising, a base member having a number of parallel cylinders, a collet positioned in one of said cylinders and being rigidly secured to said base member, said collet having a hollow center and a tapered slotted head at one end for gripping the workpiece, an actuator bar operatively positioned to compress said slotted head to engage the workpiece, and a pair of pistons movably mounted in said cylinders in said base member and operatively positioned to move said actuator bar into engagement with said collet to produce a gripping action on the workpiece, a first hydraulic fluid passage connected to said piston cylinders for actuating said pistons, a second cooling fluid passage connected to said collet cylinder for admitting cooling fluid to the exterior of said collet and a third flushing fluid passage connected to said collet cylinder to admit flushing fluid to the center of said collet.

2. The collet chuck according to claim 1 including means for biasing said actuator bar to a position to release said collet.

3. The collet chuck according to claim 1 including means secured to said actuator bars for stabilizing the movement of said actuator bar relative to said collet.

4. The collet chuck according to claim 1 including means for shielding said actuator bar to prevent chips from interfering with the operation of the collet chuck.

5. A multiple collet chuck for holding a workpiece, said chuck comprising, a base member having a number of parallel cylinders therein, a number of collets positioned in said cylinders and being rigidly secured to said base member, an actuator bar for each of said collets mounted on said base member, a pair of pistons for each of said collets positioned in said cylinders for moving said actuator bars into engagement with said collets to produce a gripping action on the workpiece, a first fluid passage connected to said piston cylinders for admitting fluid under pressure to said cylinders, a second fluid passage connected to said collet cylinder for admitting cooling fluid to said collets, and a third fluid passage connected to said collet cylinder for admitting flushing fluid to said collet.

6. A collet chuck according to claim 5 including means for guiding each of said actuator bars into engagement with said collets.

7. A multiple collet chuck for holding a workpiece for a machining operation, said chuck comprising a base plate, a number of base members mounted on said base plate and each having a collet receiving opening and a number of cylinders, a first cooling fluid flow passage in each of said base members for interconnecting said openings, a pair of second fluid flow passages in each of said base members for interconnecting said cylinders, a third flushing passage in each of said base members for interconnecting the base of said openings, a collet positioned in each of said openings and having a tapered split head and a hollow center, an actuator bar having a collet seat operatively positioned to engage the head of each of said collets to produce a gripping action on the workpiece, and a piston in each of said cylinders operatively positioned to move said actuator bars.

8. The collet chuck according to claim 7 including means in each of said openings for stabilizing the motion of said actuator bars.

9. The collet chuck according to claim 7 including means for biasing said pistons to a position where said actuator bars are released from said tapered head.

10. The collet chuck according to claim 7 including means for adjusting the depth of the center of said collets.

11. The collet chuck according to claim 7 wherein said base is formed from a number of independent base members, one of said base members having a cross connecting passage between said second passages.

12. The collet chuck according to claim 11 including means for sealing the connections of the passages between adjacent base members.

* * * * *